United States Patent
Williams

[11] Patent Number: 5,909,103
[45] Date of Patent: Jun. 1, 1999

[54] SAFETY SWITCH FOR LITHIUM ION BATTERY

[75] Inventor: Richard K. Williams, Cupertino, Calif.

[73] Assignee: Siliconix incorporated, Santa Clara, Calif.

[21] Appl. No.: 08/899,001

[22] Filed: Jul. 24, 1997

[51] Int. Cl.⁶ .............................. H01M 10/46; H02J 7/00
[52] U.S. Cl. .................................. 320/134; 320/136
[58] Field of Search .................. 320/118, 125, 320/128, 132, 134, 135, 136, 148, 149, 157, 161, 162, 163, 164, FOR 108, FOR 127, FOR 129, FOR 138, FOR 139

[56] References Cited

U.S. PATENT DOCUMENTS

| | | | |
|---|---|---|---|
| 5,539,299 | 7/1996 | Fernandez et al. | 320/103 |
| 5,547,782 | 8/1996 | Dasgupta et al. | 429/194 |
| 5,568,039 | 10/1996 | Fernandez | 320/29 |
| 5,576,611 | 11/1996 | Yoshida | 320/31 |
| 5,590,419 | 12/1996 | Shimo | 455/127 |
| 5,604,415 | 2/1997 | Vashi et al. | 320/12 |
| 5,629,542 | 5/1997 | Sakamoto et al. . | |
| 5,635,821 | 6/1997 | Smith | 320/103 |
| 5,672,952 | 9/1997 | Szepesi | 320/164 |
| 5,686,814 | 11/1997 | Wierzbicki . | |

*Primary Examiner*—Edward H. Tso
*Attorney, Agent, or Firm*—Skjerven, Morrill, MacPherson, Franklin & Friel LLP; David E. Steuber

[57] ABSTRACT

A safety switch for a lithium ion cell to prevent exceeding voltage limits associated with over-discharge and over-charging of a lithium ion cell. The safety switch includes at least one insulated gate transistor device having a low gate threshold voltage and a high transconductance to provide a power switch having a very sharp transition from an electrically conductive state to an electrically non-conductive state. The safety switch includes at least one gate voltage control circuit that does not consume power during quiescent periods or period of non-use.

11 Claims, 8 Drawing Sheets

SAFETY SWITCH FOR LITHIUM ION BATTERY

BACKGROUND OF THE INVENTION

1. Field of the Invention

The present invention relates to a safety switch for a battery, and more particularly, to a charge/discharge regulator circuit for a lithium ion battery to prevent over-charge or over-discharge of the lithium ion cell.

2. Description of the Related Art

Electrochemical batteries are generally used to provide direct current and power in a large variety of different operations. Batteries utilizing the reactivity of lithium metal are well known. Batteries employing elemental lithium as the anode, however, may become hazardous under certain circumstances. Further research in this field led to the development of lithium ion batteries in which elemental lithium is replaced by substances intercalating lithium ions. Such intercalating substances are capable of absorbing substantial amounts of lithium ions and reversibly releasing the lithium ions in a subsequent operation. An example is trilithium nitride, whose structure consists of layers of dilithium nitride, between each of which is a layer of lithium atoms. This markedly increases the conductivity, so that the material becomes an effective solid electrolyte, for example, in a lithium ion battery.

A conventional lithium ion battery has a negative electrode comprising an active material which releases lithium ions when discharging and intercalates or absorbs lithium ions when the battery is being charged. The positive electrode of a lithium ion battery comprises an active material of a different nature, one that is capable of reacting with lithium ions on discharge, and releasing lithium ions upon charging the battery. It is well known that over-discharge of the lithium cell may result in dendritic or metal filaments growing from one side of the cell to the other, or across the intercalating membranes. This electrically conductive crystalline structure can short circuit the cell and permanently destroy the cell's operation. Over charging a lithium ion battery may cause not only destruction of the cell, but may also create a fire hazard. During recharge, if the recharging voltage exceeds a certain voltage called the over-charge limit, the recharging circuit may be putting too much energy into the battery. The battery will continue to charge, however, resulting the excess energy is converted to heat. Under these conditions, the lithium ion battery may become hot, it can vent gas, and potentially catch fire.

Accordingly, a lithium ion battery safety switch or charge regulator is needed that will prevent over-discharge of the lithium ion battery, thus preventing formation of electrically conductive dendrites, as well as to prevent over-charging of the lithium ion battery, thus preventing overheating of the battery and the resultant risk of combustion or explosion.

Various charge regulating circuits have been employed including the use of FETs as fuses should the over-charge limit be exceeded, or thermal switches that sense the temperature of the lithium ion battery and open the charging circuit in the event a threshold temperature is reached. These are "one-way" switches in the sense that they open the circuit in the event recharge limits are violated (e.g., excess voltage, or excess current). Other one way switches, such as a minimum voltage sensor, detect an over-discharge condition and open a switch to prevent further discharge of the lithium ion battery. Ideally, a charge regulator circuit is bi-directional; i.e., one that can conduct in two directions and can block current in two directions.

A bi-directional switch or voltage regulating circuit, typically integrated within the lithium ion battery casing, is shown in prior art FIG. 1. A bi-directional FET assembly 1 comprising two FET transistors M1 and M2, is connected in series with the cell 6 in the lithium ion battery pack. Typically, M1 and M2 are two discrete power MOSFETs. The MOSFETs shown are N channel devices connected in a common drain configuration, although they may be connected in a common source configuration as well. A control integrated circuit 2 controls the gates 11, 12 of the MOSFETs such that either M1 or M2 will open the circuit 3 across the terminals 4, 5 of the lithium ion battery cell 6. As shown in prior art FIG. 1, the IC control circuit includes precision voltage references 7 and 8, representing the operating range limits of the cell including minimum discharge voltage of the lithium ion cell and the maximum charging voltage of the cell. Voltage comparators compare the voltage across the terminals 4, 5 of the cell with the precision voltage references and will open the circuit in the event these limits are exceeded.

During normal operation, voltages across the battery terminals will lie between the minimum discharge voltage, typically 2.5 volts, and the over-charge voltage, typically 4.2 volts, as shown in FIG. 1. In this range the gates 11, 12 of both MOSFETs are positively biased allowing current to flow though the n-channel MOSFETs. However, should the voltage fall below 2.5 volts during discharge, the output of comparator 9 associated with the over-discharge protection (ODP) portion of the control circuit 2 will output a negative voltage, blocking the current in the ODP MOSFET M1, thus opening the circuit. The presence of clamping diode 13, intrinsic to most power MOSFET structures, is of no consequence since it is reversed biased. The fact that the clamping diode 14 in MOSFET M2 is forward biased is also of irrelevant since only one of the devices need be off in order to open the circuit. Similarly, should the charging voltage exceed the 4.2 volt reference of the over-charge protection (OCP) portion of the control circuit, the output of the OCP operational amplifier 10 will go negative, switching the current off through OCP MOSFET M2 and thus, opening the circuit. In the event of an over-charge condition, the most positive part of the circuit is the drain of the MOSFET thus reverse biasing the clamping diode 14 of the OCP MOSFET so that it does not conduct.

A disadvantage of the protection circuit of FIG. 1 is that the voltage references 7 and 8 require power which is drawn from the lithium ion battery. This power draw is constant, even during periods of non-use, thus creating a constant current drain on the battery resulting in either a reduced duty cycle or operating time, or the need to recharge the battery prior to use in the event of prolonged storage. Another disadvantage of the circuit of FIG. I is that lithium ion battery over-discharge and over-charge voltages are critical and must be maintained within a very narrow range, typically 80 millivolts. Further, these reference voltages are battery specific and must be intimately tied to the characteristics of the battery in which the circuit is employed. Exceeding the maximum charging voltage, even for a brief period of time may result in thermal runaway of the battery and its eventual destruction. These factors have resulted in development and commercialization of very complex control ICs comprising precision analog circuits, having very low current consumption over a wide temperature range. These ICs represent a significant portion of cost of the battery assembly and severely limit the commercial applications to which lithium batteries might be used.

An example of the lithium ion battery switch shown in Figure one is disclosed by Fernandez et al. in U.S. Pat. No.

5,539,299. They disclose a recharging circuit for a lithium ion battery that utilizes a control circuit for sensing over-charge conditions. Upon sensing an over-charge condition, the control circuit biases the gate of a power MOSFET to prevent current flow from the charging circuit to the battery. Typical of the device diagrammed in prior art FIG. 1, the device disclosed by Fernandez utilizes a control circuit comprising an operational amplifier and a voltage reference. These devices consume energy from the battery even when the load is disconnected.

Accordingly, there is a need for a protection switch for a lithium ion battery that will provide battery protection from over-discharge or over-charge condition comparable in performance to protection switches currently available except without the need for complex, active control circuits and have substantially no power drain on the battery.

SUMMARY OF THE INVENTION

It is advantageous to provide a safety switch for a lithium ion battery without a complex, active analog control circuit for determination of over-charge and over-discharge conditions, as the elimination of the control circuit would prolong battery life, reduce manufacturing cost, and enhance the commercial use of lithium ion batteries. It is therefore an object of this invention to provide a protective switch for a lithium ion battery, not incorporating a complex control circuit, for identifying out of range voltage conditions during discharge and re-charge of the lithium ion cell to cause immediate open circuit conditions in the event of such out of range voltage condition.

It is also advantageous to provide a method for protecting a lithium ion battery from an over-discharged or over-charged condition without the need for complex, active control circuits. Accordingly, it is another object of this invention to provide a process for switching off the current in a lithium ion battery circuit using only discrete devices in the event an over-discharge or over-charge voltage condition is encountered.

Other objects and advantages will become evident from the specification and claims.

According to the present invention, a protective switch is provided for providing high impedance blocking of the current in a circuit containing a lithium ion battery upon the occurrence of an out of range voltage condition. Unlike the current switches of the prior art wherein complex, active control circuits are required to determine whether either an upper or lower voltage threshold has been violated, the protective switch of this invention does not require an active control circuit.

Lithium ion batteries commercially available today are typified by an over-discharge voltage of 2.5 volts at the terminals of the lithium ion cell, and are over-charged when the terminal voltage exceeds 4.28 volts. These batteries are further characterized by their tendency to exhibit thermal run away when the terminal voltage during recharge exceeds 4.28 volts. This very narrow, 80 millivolt voltage range between the charged 4.2 volt condition and the over-charged 4.28 volt condition requires the complex control circuits of the prior art to ensure that the resistance of the protection circuit would begin to increase steeply within approximately a hundred millivolts of this over-charged and over-discharged voltage limits to effectively create an open circuit at the voltage limits, thus stopping either further discharge or further charging of the lithium ion battery.

Applicants have discovered that a source of the problem of not using active circuit components in the control circuit is that presently available MOSFETs do not have a very steep turn-off characteristic. Accordingly, a novel feature of the protective switch of this invention is the very steep turn-off characteristics of the power MOSFET direct current switching devices. For example, at the over-discharge voltage, the gate of the MOSFET is below its threshold voltage and the MOSFET has a drain-source resistance (OFF resistance) of greater than 1 megohm. However, within a few millivolts above the over-discharge voltage (above the threshold voltage), the MOSFET is in an ON state and its resistance will run from a few milliohms to a few ohms. We have found that the steep turn-off characteristic of the MOSFET used in the device of this invention may be constructed from a MOSFET designed to have a low threshold voltage and a very high transconductance; i.e., the ratio of $I_{out}/V_{in}$ or $g_m$. Note that the output current, $I_{out}$, as well as transconductance $g_m$, is proportional to the width, W, of the channel, and inversely proportional to the length, L, of the channel. Further, the output current is also proportional to the field intensity of the gate which in turn is proportional to the capacitance of the gate oxide of the MOSFET. Expressing the transconductance in terms of the design of the MOSFET:

$$g_m \; C_{ox} \times W/L \qquad \text{Eq. 1}$$

Where: $C_{ox}$ is the capacitance of the gate oxide;
W is the width of the channel; and
L is the length of the channel Accordingly, a novel feature of the protective switch of our invention includes a MOSFET having a low threshold voltage and high transconductance characterized by a relatively wide and short channel, and a high gate oxide capacitance (i.e., large area, thin gate oxide).

The MOSFETs of our invention have threshold voltages approaching the overdischarge voltage limit (e.g., 2.5 volts) and the over-charge voltage limit (e.g., 4.28 volts). These voltages represent the gate voltages whereby the drain-source resistance of the MOSFET is close to its highest value (e.g., 1–10 megohms). Accordingly, for an over-discharge condition, the over-discharge protection MOSFET is designed to begin turning off the current at some voltage as close as possible to and above the over-discharge voltage point, preferably within 100 millivolts and to substantially turn off the current at the over-discharge voltage. Similarly, the MOSFET associated with the over-charge portion of the protective switch of this circuit will begin turning off the current from the charging source to the battery at some voltage as close as possible to and below the over-charge voltage point preferably within 100 millivolts, and substantially turn the current off once the over-charge voltage is reached.

As described above, the gate voltages in the MOSFET switches of the prior art are controlled by voltage comparators comprising precision voltage references and operational amplifiers. These components continue to draw current from the battery even during periods of non-use or storage, thus representing a constant power drain. The result of this continuous power drain is that the battery, at best, will always be partially discharged prior to its use after any storage period. The protective switch of this invention overcomes this limitation of the prior art by driving the gates of the power MOSFETs with passive components that draw insignificant or no current.

Accordingly, a novel feature of the protective switch of this invention is that there is no precision reference voltage source and no voltage comparator control circuits to bias the gates of the MOSFET switches. In the device of this invention, the gate of the MOSFET for the over-discharge portion of the protective switch is driven either directly by the positive terminal of the battery, or through a gate resistor. In either case, the threshold voltage of the over-discharge MOSFET is predetermined to ensure that the current is substantially cut-off below the over-discharge critical voltage. A very steep turn-off is desirable to ensure that the ON resistance of the MOSFET stays low for voltages above the over-discharge critical voltage, yet goes high, e.g., greater than 1 megohm, at the over-discharge critical voltage.

Similarly, the over-charge portion of the protective switch of this invention also uses at least one MOSFET having steep turn-off characteristics, and no active control circuit, thus eliminating any power drain during periods of non-use or storage of the battery. Furthermore, the requisite steepness of the MOSFET turn-off characteristic can be relaxed slightly with the advent of new battery chemistries. For example, methods under development may extend the over-charge condition beyond 4.28 volts to 4.5 volts or methods to decrease the over-discharge voltage to 1.8 volts.

The protective switch of this invention is described by way of example for clarity of illustration, and not by limitation using N-channel MOSFET insulated gate devices. It is understood that a person of ordinary skill in the art will recognize that the protective switch device and method of this invention may be practiced with other insulated gate devices such as trench FETs, VMOS, DMOS, PMOS and CMOS FET devices substituted for the N-channel MOSFET devices described above, albeit with appropriate modifications to the supporting circuitry.

BRIEF DESCRIPTION OF THE DRAWINGS

The present invention may be better understood, and its numerous objects, features, and advantages made apparent to those skilled in the art by reference to the accompanying drawings.

The use of the same reference symbols in different drawings indicates similar or identical items.

DESCRIPTION OF THE PREFERRED EMBODIMENT(S)

Figure 2:
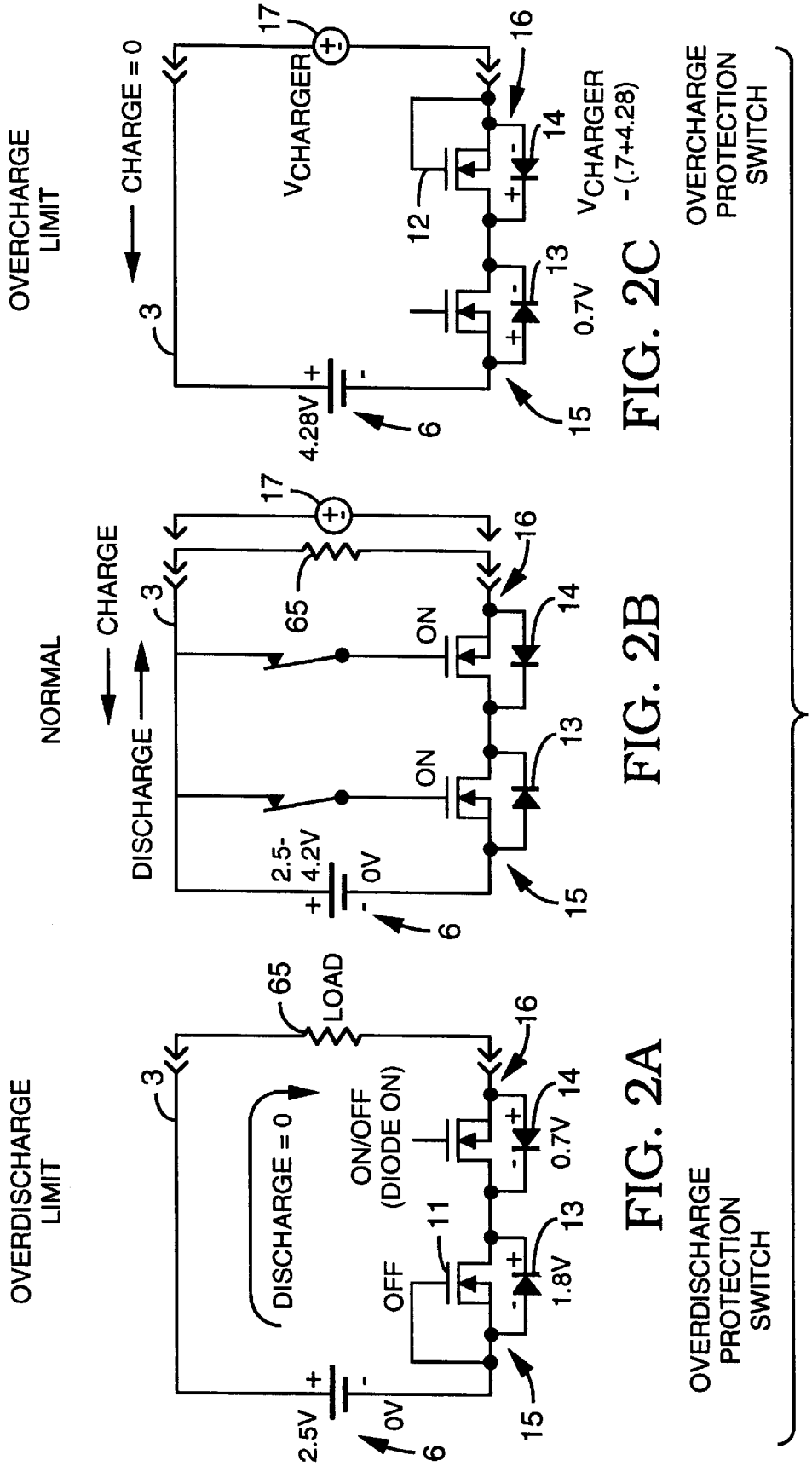
FIGS. 2A–2C are conceptual diagrams showing the equivalent circuit structure for over-discharged, normal, and over-charged circuit conditions.

Referring now to FIG. 2A, a conceptual diagram of a lithium ion cell 6 in a circuit 3 having been discharged through a load 65, the protective switch of this invention is shown in an over-discharged condition. In this diagram, the over-discharge limit, for example 2.5 volts, has been reached. The over-discharge protection (ODP) switch MOSFET 15 is designed to be off under this condition, conceptually illustrated in this schematic by a gate to source short. The off condition achieved in conventional methods is to bias the gate to an off state. In an embodiment of this invention, the MOSFET 15 is designed to have a threshold voltage range such that the channel resistance increases to a large value within a few millivolts of the over-discharge voltage. The threshold voltage of the power MOSFET 15 is set at or slightly above the over-discharge voltage, and is shown in FIG. 2A in an open, or off, state in response to the lithium ion cell having been discharged to the typical over-discharge critical voltage of 2.5 volts. Since only passive components are used in the safety switch of this invention to control the gate 11 voltage of MOSFET 15, and since the direct current resistance of the gate 11 of MOSFET 15 is very large, there is no constant power drain from the lithium ion cell as is typical in the safety switches of the prior art. Note that the drain-source diode 13 is reverse-biased thus preventing current from flowing. The voltage drop across the source-drain diode 14 of the over-charge MOSFET 16 is forward biased, and therefore cannot block conduction regardless of the state of its gate. The current can be switched off only by the ODP device 11 .

The safety switch of this invention operating in the lithium ion battery 6 circuit 3 in normal mode (i.e., between the over-discharge and the discharge voltages) is shown conceptually in FIG. 2B. In this case both the over-discharge protection ODP switch and the over-charge protection (OCP) switch comprising power MOSFETs 15 and 16 respectively, are closed, or in their ON state, permitting current to flow through the MOSFETs. The passive component gate circuits are depicted as closed single pole single throw switches connected between the positive pole of the battery 6 and the high resistance gates of MOSFETs 15, 16 illustrating that no current or power is drawn by these circuits. In this mode, the source-drain diode 13 of the ODP MOSFET is reverse biased, therefore non-conducting, while the source-drain diode 14 of the OCP MOSFET is forward biased but channel current bypasses the diode network. Either a load 65 or a battery charger 17 may be connected to the circuit 3, showing that the switches are bidirectionally conductive so long as the circuit voltage is within the indicated OC/OD voltage range.

The over-charge condition is shown in FIG. 2C, wherein the OCP MOSFET 16 is off, i.e., non-conducting, thus driving the current to zero. The ODP MOSFET 15 remains open. In this case the source-drain diode 14 of the OCP MOSFET is reversed biased, precluding current flow through the open MOSFET 16. MOSFET 16 is represented as off by the gate to source short shown in its schematic. In the prior art, this condition was performed by shorting the gate to the source through a gate driver circuit. Instead, in the preferred approach of this invention, the gate threshold voltage of the OCP MOSFET 16 is set to a value such that gate and source are clamped when the maximum over voltage is reached resulting in the channel resistance increasing to a large value. The threshold voltage is preferably set to begin driving the current to zero when the charging voltage approaches to within about 80 millivolts below the maximum charge voltage. For today's cells and below several hundred millivolts for new cell technologies, the threshold voltage value of the OCP MOSFET 16 will depend on the maximum overcharge voltage for the particular lithium ion cell being protected, the characteristics of the circuit controlling the OCP MOSFET gate voltage, and the operating characteristics of the OCP MOSFET in the vicinity of its threshold voltage. Typically, the over-charge voltage limit is between 4.2 volts and 4.28 volts for currently available lithium ion cells, but can be increased with improvements in lithium ion cell construction up to 4.5 volts, depending on new chemistries.

At the onset of over-charging, the maximum voltage that must be blocked by the OCP MOSFET 16 is the voltage of the charging device minus the voltage across the battery. Since the minimum battery voltage is the over-discharger limit, e.g., 2.5 volts, then at least that amount can be guaranteed across the battery. For example, if the charging voltage is 12 volts, then the maximum voltage which the OCP MOSFET must block is 12 minus 2.5, or approximately 9.5 volts. Since the drain-source breakdown voltage of most power MOSFETs exceeds 12 volts, this is not a concern. Even higher voltage MOSFETs can be used but with higher resistance or larger area (higher costs). However, the gate-source breakdown voltage may be as low as 8 volts. For inputs beyond $V_{gs}$ (max) of MOSFET 16, additional voltage clamping is needed, thus limiting the voltage used to drive the gate of the OCP MOSFET 16.

Advancements in lithium ion battery construction would lower the over-discharge voltage limit from 2.5 volts to about 1.8 volts, and would increase the over-charge voltage limit from 4.28 volts to about 4.6 volts. Table I below contrasts the voltage range of lithium ion cells presently available with future cells expected in the near future.

TABLE I

| Operation | Today's Cell Voltage | Future Cell Voltage | Switch Condition | |
|---|---|---|---|---|
| | | | ODP MOSFET | OCP MOSFET |
| Over-discharge | <2.5V | <1.8V | OFF (blocking) | Don't Care (diode conducts) |
| Normal | 2.5–4.2V | 1.8–4.6V | ON | ON |
| Over-charge | >4.28V | 4.6V | Don't Care (diode conducts) | OFF (blocking) |

Surprisingly, the wider voltage range of 1.8–4.6 volts as compared to 2.5–4.2 volts, in the normal operating mode voltage increases the amount of time between recharges by only a few minutes. This wider voltage range may be used, then, to advantage, not to increase the battery duty cycle, but rather to reduce the complexity of the of the battery disconnect switching circuit to eliminate the need for a complex controller circuit. Alternately, the wider range softens these trip points to permit using power MOSFETs having device characteristics that include less than ideal turn-off characteristics; i.e., the abruptness in the transition from conductor to non-conductor at the threshold voltage may exceed 100 millivolts and increase to 200 to 400 millivolts. For example, a MOSFET that begins turning off at 4.2 volts in the charging circuit need turn completely off at 4.6 volts rather than at 4.28 volts as would be required in today's lithium ion cells. This additional three to four hundred millivolts will permit eliminating the complex gate voltage control circuit whose precision voltage sources, comparators, and active circuits would no longer be required, even with MOSFET switches have less than ideal turn-off characteristics. Alternatively, by providing a MOSFET switch of this invention that exhibits a very steep turn-off characteristic, the complex control IC may still be eliminated, and the duty cycle of the battery prolonged by taking advantage of the extended voltage range.

Figure 1:
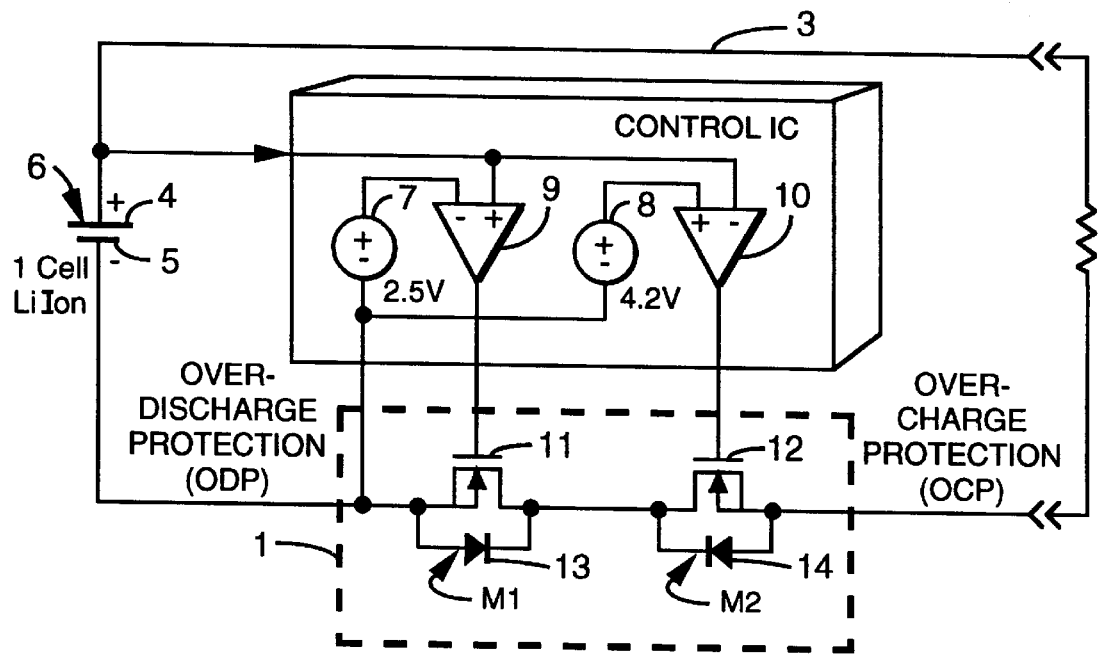
FIG. 1 is a schematic diagram illustrating the operating principles of protective switches and their associated control circuitry of the prior art.
Figure 3:
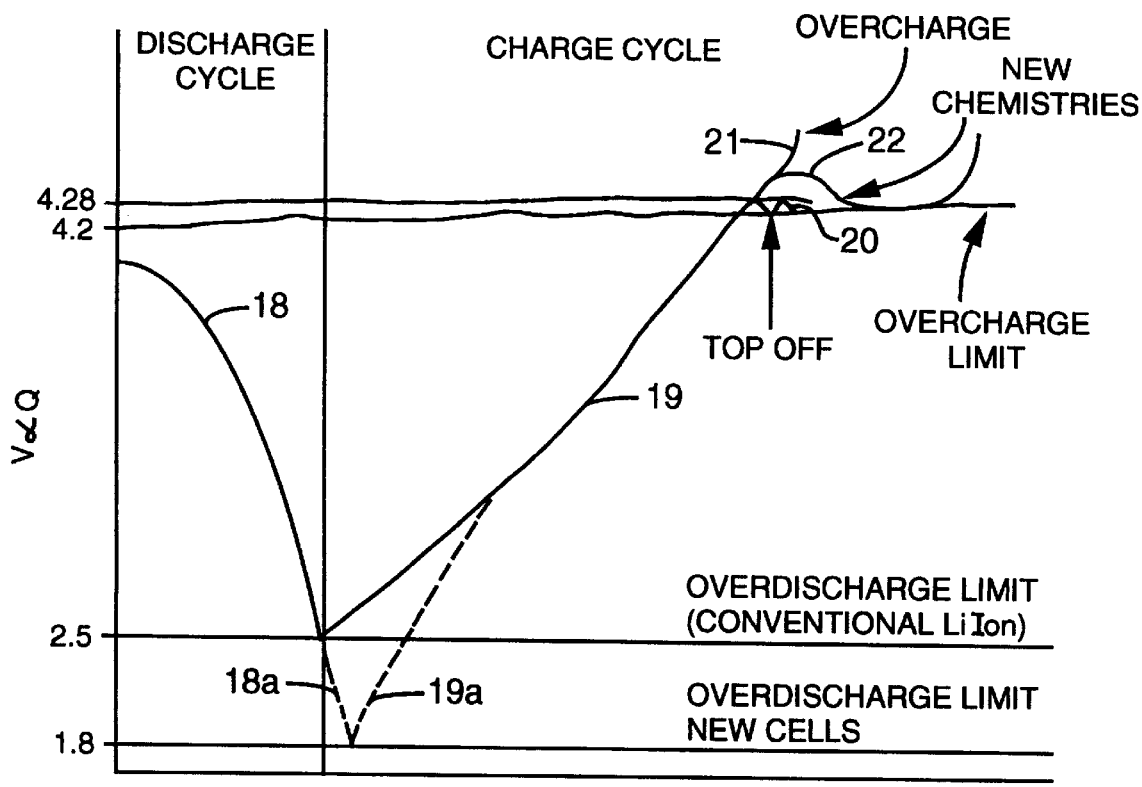
FIG. 3 is a graph comparing the over-discharge and over-charge limits of conventional currently available lithium ion cells with the over-discharge and over-charge limits of next generation, or new cells.

The charging cycle of a typical lithium ion cell as compared to future cells is shown in FIG. 3. Today's batteries discharge down to about 2.5 volts as illustrated by line 18, whereas the future lithium ion cells will permit discharging the cell down to about 1.8 volts as shown by line 18a. During recharge as shown by lines 19 and 19a, the over-charge limit is 4.2 volts. Typically, the battery must be topped off by turning OFF the OCP MOSFET, and allowing the chemistry in the lithium ion cell to relax. Additional charge 20 is subsequently trickled in to make sure the battery is fully charged. The charging voltage must not exceed 4.28 volts on today's cells otherwise the cell may go into a thermal runaway condition 21 resulting in possible fire or explosion. It is anticipated that new chemistries will provide for a wider voltage range permitting a slight over-charge 22. The voltage will actually decline back down to 4.2 volts and won't begin to rise again during recharge for additional recharge until some later time. This additional voltage range permits a safety switch circuit for the lithium ion battery not having the complex active control circuits of the prior art. Although one embodiment of the safety switch of this invention utilizes the wider voltage range of future lithium ion cells, a person of ordinary skill in the art will recognize that the safety switch of this invention may also be practiced using lithium ion cells currently available by narrowing the operating range of today's battery to accommodate the voltage range required to turn off the MOSFETs (i.e., the voltage range required in order for the MOSFET to go from an ON state to an OFF state).

Figure 4A:
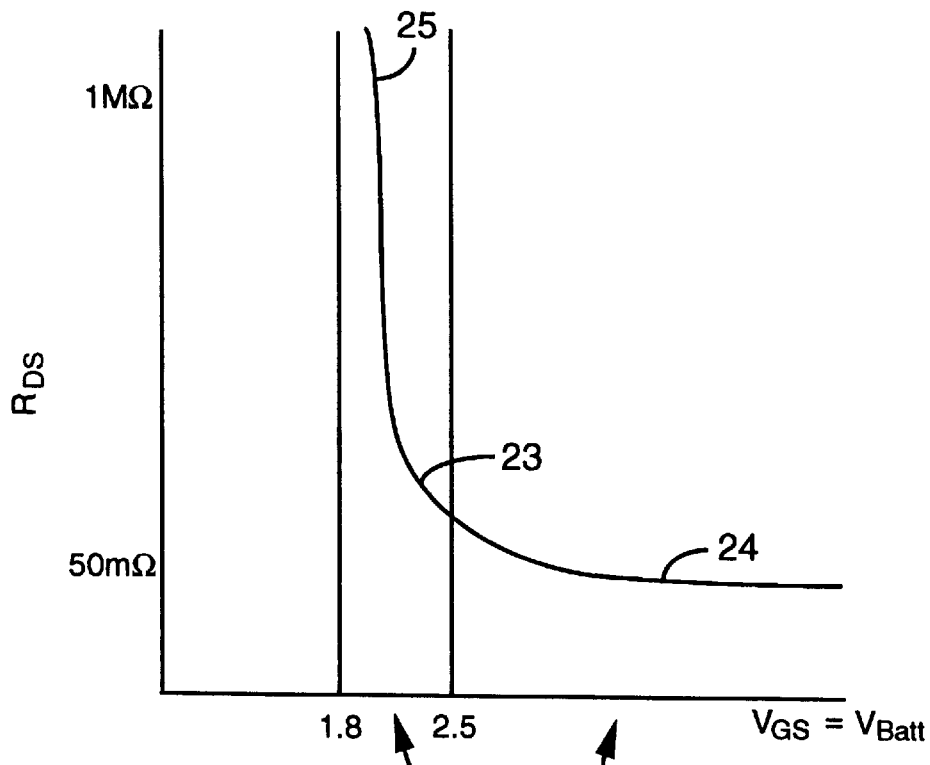
FIG. 4A is a graph of the channel resistance as a function of gate voltage for a MOSFET in the over-discharge portion of the protective switch of this invention as shown for next generation lithium ion cells having a 1.8 volt over-discharge voltage limit.

The operating characteristics an embodiment of the ODP MOSFET 15 of the safety switch of this invention is shown in the chart of FIG. 4A. The voltage on the abscissa is the gate voltage, which for the ODP MOSFET is substantially equal to the battery voltage. Preferably, the ODP MOSFET 15 is designed to have a very steep turn-off characteristic as shown by the sharp transition 23 from the conducting portion of the resistance curve 24 to the non-conducting portion of the resistance curve 25. The low resistance region 24 of the resistance curve includes the operating voltage region 26 where the gate voltage (i.e., battery voltage) is significantly greater than the over-discharge limit of the battery; 2.5 volts in this case. In this region, the ON-state, the drain-source resistance of the MOSFET runs a from 50 milliohms to a few ohms. The OFF state 27 lies between approximately 1.8 volts to approximately 2.5 volts for the ODP MOSFET.

Figure 4B:
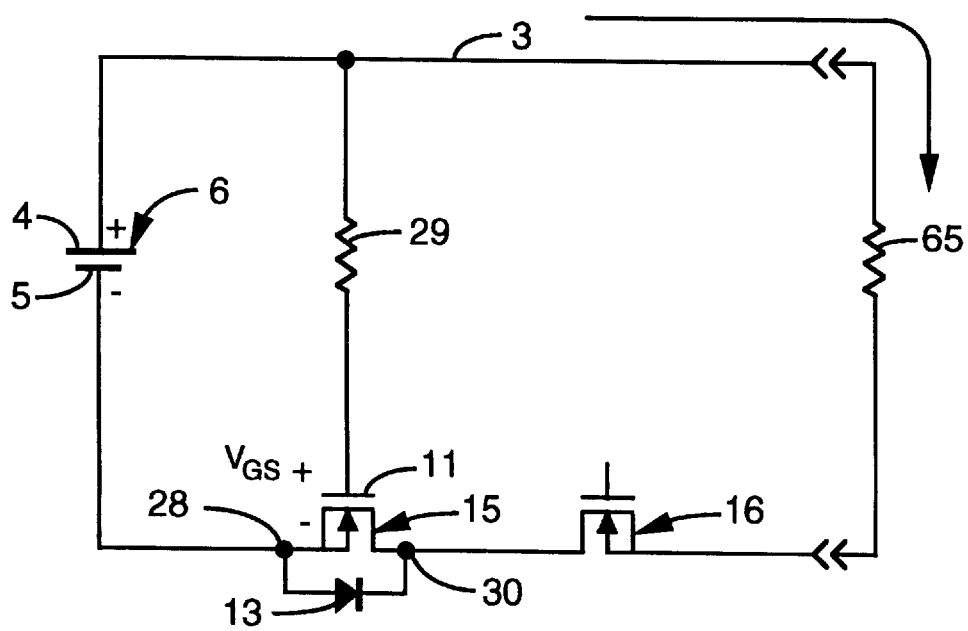
FIG. 4B is a conceptual circuit diagram of the preferred embodiment of the over-discharge portion of the protective switch of this invention.

FIG. 4B shows an over-discharge protection (ODP) MOSFET 15 safety switch of this invention installed in a circuit 3 having a lithium cell 6, a load 65, and an OCP MOSFET 15 in an ON state. The source terminal 28 of the MOSFET 15 is installed against the negative terminal 5 of the lithium ion cell 6. The gate 11 of the MOSFET 15 is connected to the positive terminal 4 of the lithium ion cell 6, either directly, or preferably via a gate resistor 29, as shown, or some other passive component to protect the gate from voltage spikes due to switching or inductive loads, or from voltage spikes resulting from electrostatic discharge. In the event the lithium ion cell 6 is over-discharged, the ODP MOSFET 15 channel resistance becomes large, effectively opening the circuit. The drain 30 will have the most positive charge, thus reverse biasing the drain-source diode 13. As a result, the current in the circuit is blocked.

Figure 5:
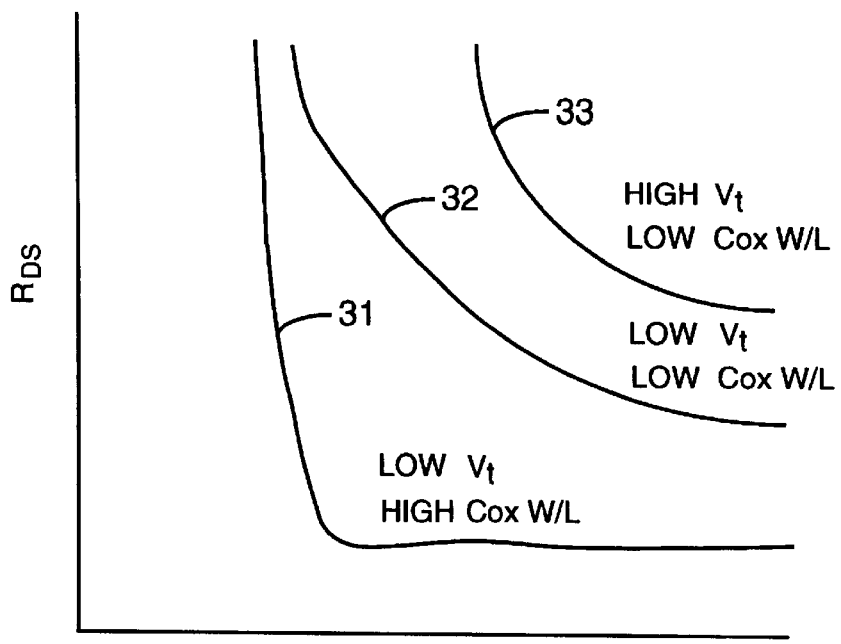
FIG. 5 is a is a set of drain-source resistance curves comparing the On-state to OFF-state transition regions of MOSFET devices having different threshold voltages and different transconductance.

FIG. 5 is a chart showing drain-source resistance/gate voltage curves for MOSFET devices with a combination of different threshold voltages ($V_t$), and transconductance as expressed by the design variables: gate oxide capacitance ($C_{ox}$), channel widths (W) and channel lengths (L). As explained above, the transconductance of the MOSFET is proportional to $C_{ox} \times W/L$. We have found that the sharp turn-off characteristic of the preferred MOSFET is optimized by a MOSFET device having a low $V_t$ and a high transconductance as shown by curve 31. This points to a high power, high density MOSFET as the OCP or ODP switching device. Preferred devices exhibiting these characteristics include multi-million cell per square inch trench FETs, high density quasivertical devices, vertical planar DMOSs, and large area lateral devices. Those devices that do not have a low threshold voltage, or that have a lower packing density (as characterized by a lower Cox or W, or larger L) exhibit resistance/gate voltage curves that have a less well defined transition point from the conducting region to the nonconducting region as shown by curves 32 and 33. These devices undesirably begin turning off while in the normal operating voltage of the lithium ion cell, thus limiting the useful voltage range of the cell during normal operation.

Figure 6:
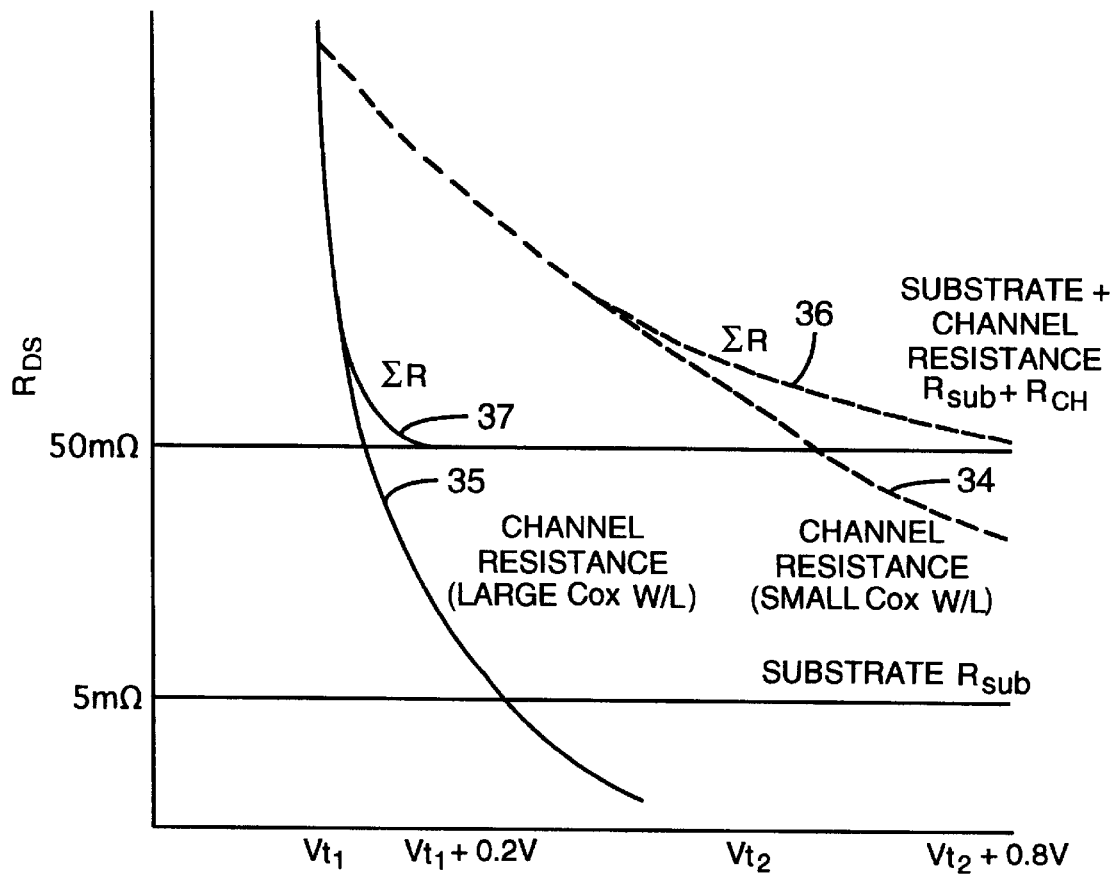
FIG. 6 is a chart showing the relationship of the gate voltage dependence of channel resistance as a function of transconductance.

The resistance of a power MOSFET is the sum of the substrate resistance, the active layer (i.e., the doped semiconductor layer including the drain and source) resistance, and the channel resistance. The active layer may be an epitaxial, amorphous, or polycrystalline material which overlies the substrate. As seen in FIG. 6, the sum of resistances for the device having a low threshold voltage and high transconductance is very steep. FIG. 6 is a chart showing the channel resistance of small transconductance 34 (small $C_{ox}W/L$) as compared to high transconductance (large $C_{ox}W/L$) 35 devices. The channel resistance associated with the small $C_{ox}W/L$ device sums to a gradual transition 36 between the ON state and the OFF state, typically requiring an approximately 800 millivolt range in order to make the ON-to-OFF transition. By comparison the resistance curve for the large $C_{ox}W/L$ power MOSFET preferred in the practice of the safety switch of this invention exhibits a transition region 37 of only a few hundred millivolts between the ON state and the OFF state.

Figure 7:
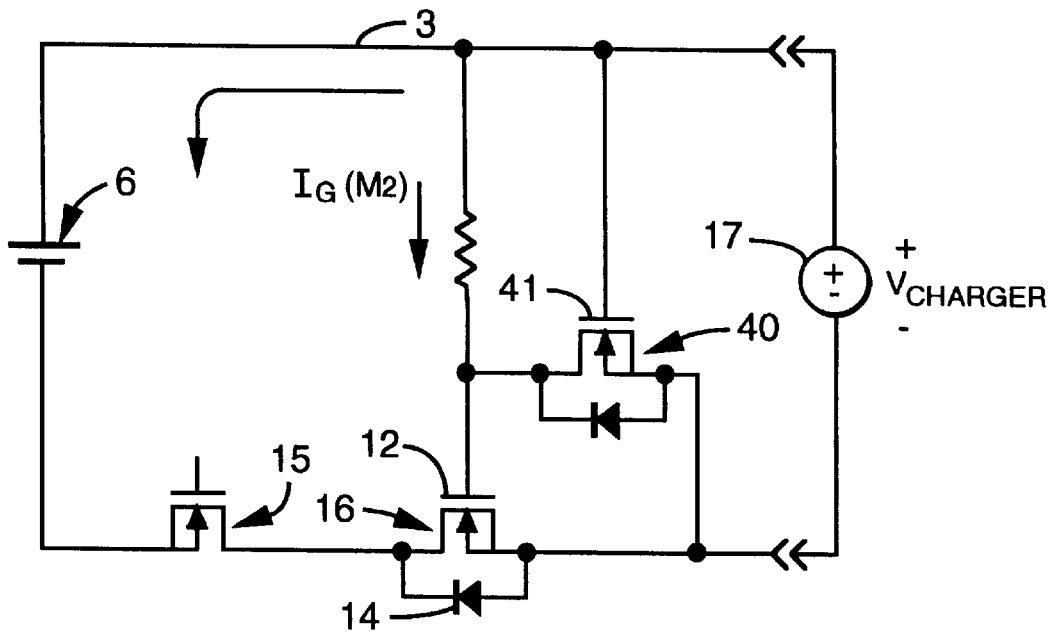
FIG. 7 is a conceptual diagram of a preferred embodiment of the over-charge protection portion of the safety switch of this invention.
Figure 8:
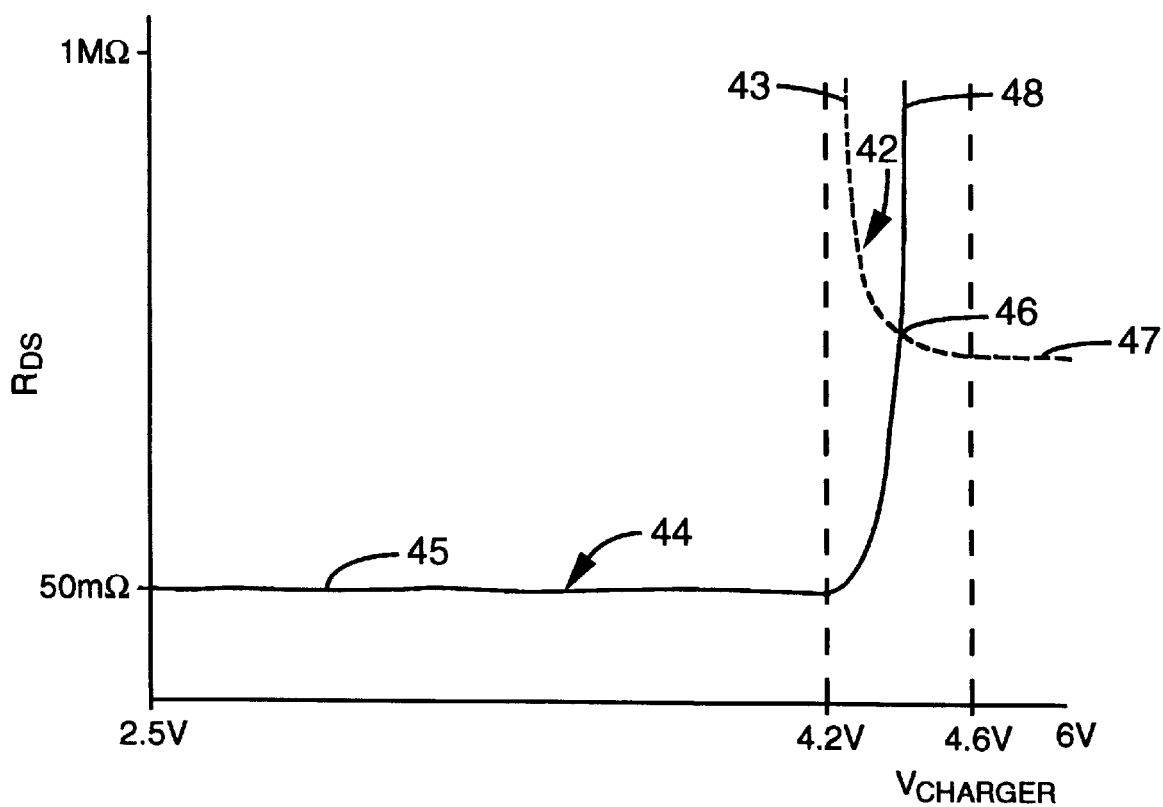
FIG. 8 is a chart showing the channel resistance of the insulated gate devices of FIG. 7 versus the charging voltage.

FIG. 7 is a diagram of an embodiment of the over-charge portion of the safety switch of this invention using an N-channel power MOSFET as a D.C. current switch. The OCP MOSFET 16 is installed with the source on the positive side of the lithium ion cell. An additional control MOS transistor 40 is placed between the gate 12 and the source of the OCP MOSFET 16. The control MOS device has a threshold value tailored to turn ON the transistor (i.e., low drain-source resistance) for gate 41 voltages beginning in the range just below the over-charge voltage and above. The OCP MOSFET 16 threshold voltage may be set to a low value consistent with our design for a device having a very steep turn-off characteristic. By way of operation, when the over-charge voltage limit is reached, the control MOS device 40 switches on, thus clamping the gate 12 of the OCP power MOSFET 16 to it's source, thus shutting off the current flow through the OCP MOSFET. The drain-source diode 14 is off no design consequence, since the current flow during the charging cycle is such that the diode is reverse biased. The device characteristics of the OCP MOSFET 16 and the control MOS transistor 40 are shown in FIG. 8. At voltages less than about 4.2 volts, the control MOS transistor is turned off (as indicated by the vertical region 43 of resistance curve 42) and the OCP MOSFET is turned on (as indicated by the horizontal region 45 of resistance curve 44) permitting current to flow through the circuit. At approximately 4.2 volts the threshold voltage of the control MOS device is reached and the control MOS device begins to conduct, as shown by transition region 46. As the voltage approaches the maximum over-charge voltage (e.g., 4.6 volts as shown for a future lithium ion cell), the control MOS device 42 resistance becomes small as shown in region 47. Consequently, the gate and source of the OCP MOSFET are at the same potential, thus clamping the gate of the OCP MOSFET to the source voltage, resulting in the resistance of the OCP MOSFET going large as shown by region 48 of the resistance curve 44. The control MOS device draws no current since the D.C. resistance of the gate oxide within the device is large (>1 megohm).

Figure 9:
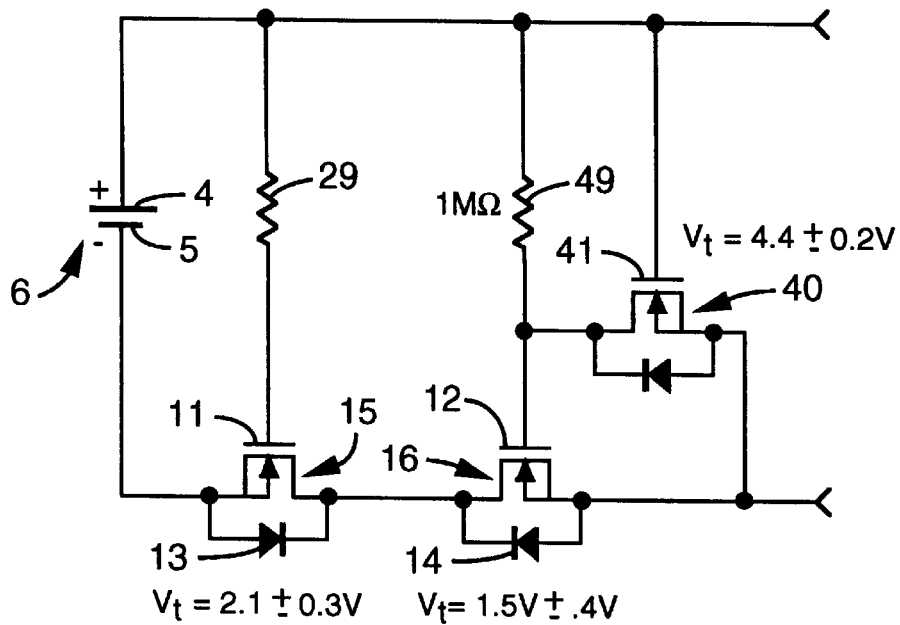
FIG. 9 is a conceptual diagram of a preferred embodiment of the safety switch of this invention having both over-charge and over-discharge protection.
Figure 10:
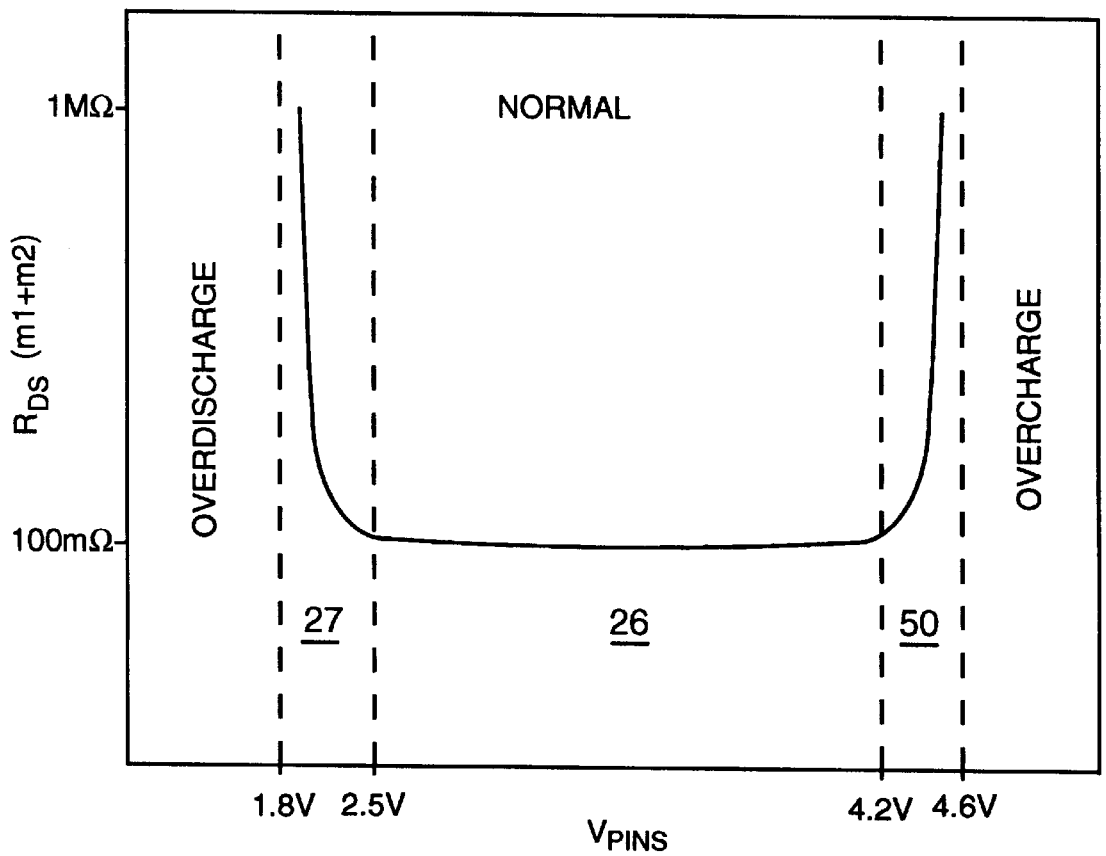
FIG. 10 is a chart showing the operating characteristics of the preferred embodiment of FIG. 9.

Another embodiment of the safety switch of this invention including both OCP and ODP power MOSFETs and passive control elements is shown in FIG. 9. The threshold voltage of the ODP MOSFET 15 in this Figure is set to approximately the over-discharge voltage value, for example, 2.1±0.3 volts as shown. The gate 11 is connected either directly or via a gate resistor 29 to the positive side 4 of the lithium cell 6 so that the gate voltage at any time is substantially equal to the cell voltage. As a result, as the cell voltage decreases with the discharge of the battery, the gate voltage also decreases until the threshold voltage is attained. At the threshold voltage the resistance of the ODP MOSFET 15 rapidly becomes large. The OCP MOSFET 16 of FIG. 9 is set so that it is always ON above some low threshold voltage greater than zero (for example, 1.5 volts as shown in FIG. 9). The control device 40 is also an insulated gate transistor, preferably a MOSFET, or alternately a trench FET, VMOS, DMOS, PMOS or CMOS FET, having a threshold voltage equal to the critical over-charge voltage. By way of operation, when the circuit voltage is below, for example, the critical voltage of 4.2 volts, the OCP MOSFET 16 continues to conduct, and the insulated gate control device (IGCD) 40 remains open or in an OFF state. The gate resistor 49 is set to a high value, for example 1 Megohm, to keep the gate 12 voltage below the threshold voltage and to protect the gate 12 of the OCP MOSFET 16 from voltage spikes and the like. At a charging voltage of approximately 4.2 volts the IGCD 40 begins to conduct, and at 4.6 volts the IGCD 40 is in a fully ON state. As a result, beginning at about 4.2 volts the gate voltage of the OCP MOSFET 16 is clamped to the source voltage via the IGCD 40, thus completing shutting off the current flow through the OCP MOSFET 16. The threshold voltage of the IGCD 40 is critical, and is set so that the IGCD 40 is fully on at the over-charge voltage i.e., 4.6 volts. The OCP MOSFET 16 may be set to a lower threshold voltage, e.g., to 1.5±0.4 volts to ensure a steep turn-off characteristic, the actual threshold voltage value being otherwise arbitrary, except that it be far enough above the source voltage to ensure complete current shut off when the gate is clamped, and lower than the gate threshold voltage of the ODP MOSFET 15. The overall operational characteristics of this embodiment of the safety switch of this invention is shown in FIG. 10. An over-discharge region 27 below about 2.5 volts and above 1.8 volts results in a rapid increase in the resistance of the circuit as seen by the lithium ion cell to above I megohm. As the voltage of the lithium ion cell exceeds 1.8 volts the resistance decreases rapidly such that at and above 2.5 volts, in the normal operating region 26, the resistance of the circuit as seen by the lithium ion cell is approximately a few hundred milliohms to a few ohms. The resistance remains flat at a few hundred milliohms over the entire normal operating range 26 of the lithium ion cell and then rises again at voltages above 4.2 volts, the over-charged region 50, to over one megohm before 4.6 volts is reached.

Figure 11:
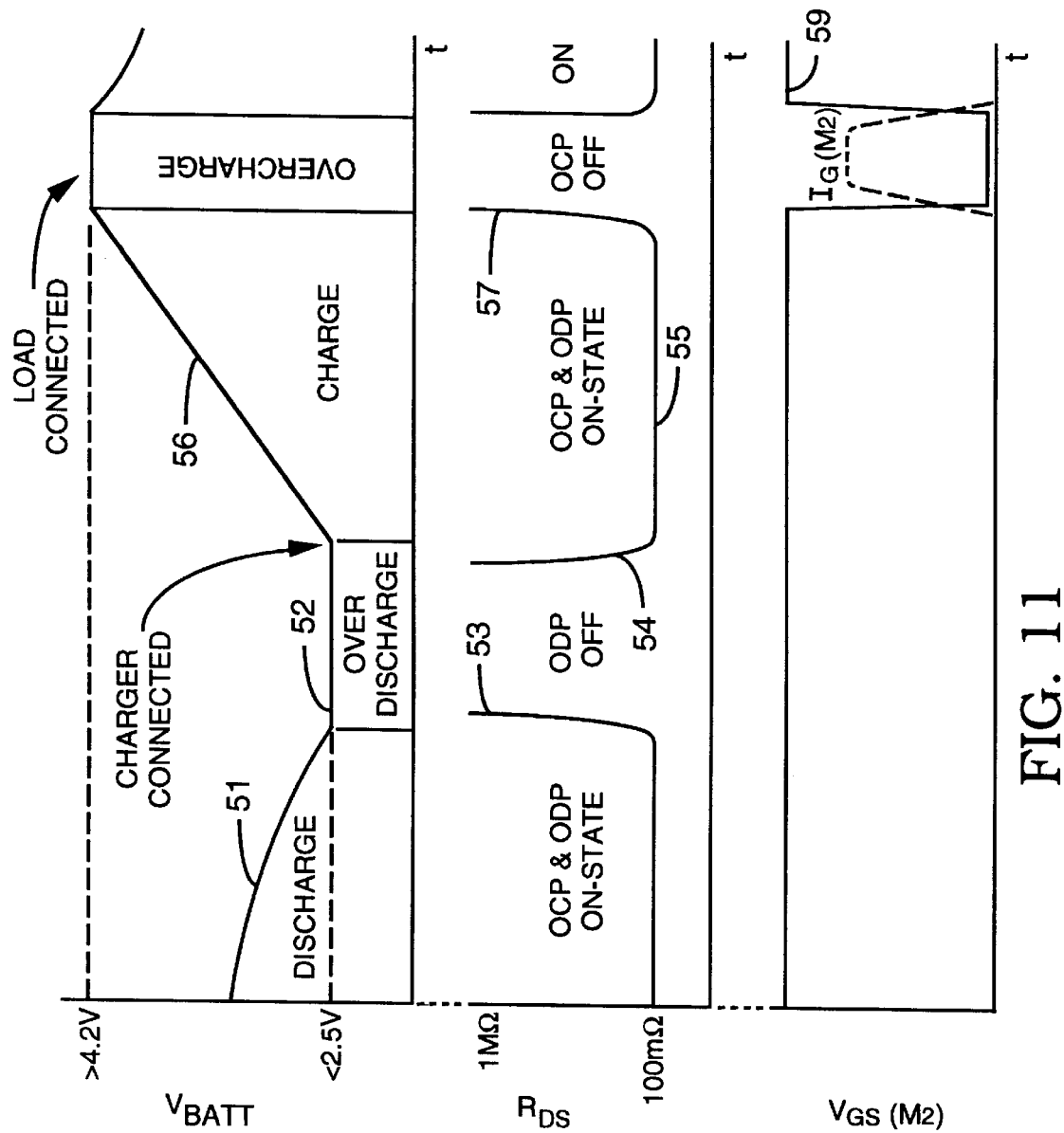
FIG. 11 is a chart of the transfer switching characteristics of the safety switch of this invention.

FIG. 11 shows the transfer switching characteristics of the safety switch embodiment shown in FIG. 9. During normal discharge 51 of the battery, the battery voltage drops from a voltage greater than 2.5 volts down to approximately 2.5 volts at which point an over-discharge condition exists 52 causing the circuit resistance to go high 53 since the ODP MOSFET 15 resistance is now large. Once the charger is connected, the voltage across the lithium ion cell increases 56, causing the ODP MOSFET 15 resistance to go low 54, thus resulting in a low circuit resistance 55. As the voltage increases and approaches the 4.2 over-charge voltage, the gate control device (GCD) is actively biased, thus clamping the OCP MOSFET source to its gate causing the OCP MOSFET resistance to go high 57. This in turn results in the circuit resistance becoming large, thus shutting off the current in the circuit. Once the charger is disconnected and the load connected, the battery voltage drops below 4.6 volts, both the OCP and ODP MOSFETs 15 and 16 turn on to allow current to flow 59 in the circuit for normal discharge of the battery.

Figure 12:
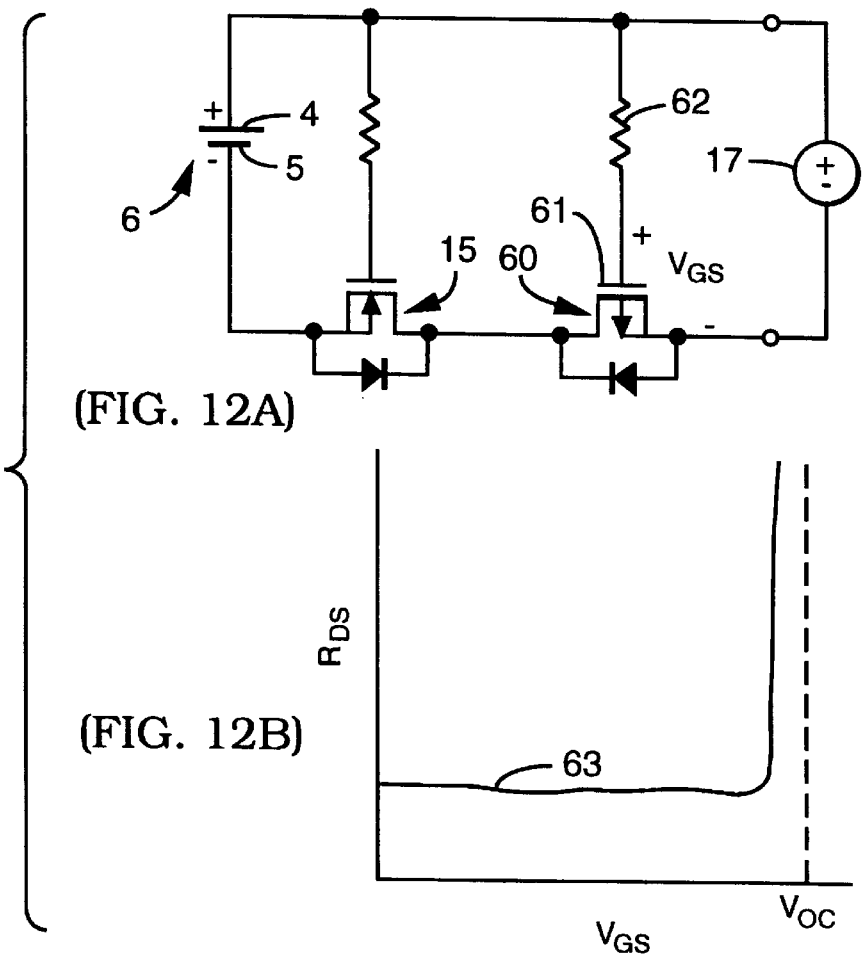
FIG. 12A is a conceptual diagram of an alternate preferred embodiment of the safety switch of this invention utilizing a PMOSFET for protecting against over-discharge.
FIG. 12B is a chart of the drain-source resistance of a PMOS of this invention.

An alternate embodiment of the safety switch of this invention as shown in FIG. 12A utilizes a high transconductance, thin gate oxide version of the depletion mode PMOS for the OCP MOSFET 60. This embodiment further simplifies the gate control circuit by eliminating the extra GCD 40 required for the N-channel OCP MOSFET. Instead, the gate 61 of the OCP MOSFET 60 may now be connected either directly or via a gate resistor 62 to the positive terminal 4 of the lithium ion cell 6. PMOS devices must be threshold adjusted after the gate oxide, or after the polysilicon gate layer is formed if it is a double diffused device. The threshold voltage is adjusted by ion implantation of dopant through the gate electrode and into the semiconductor surface under the gate. The threshold voltage can be fine tuned to ensure that the device will turn off before the over-charge voltage is reached, as seen by the resistance Here the drain-source resistance of the PMOS device is low 63 until the gate voltage approaches the over-charge voltage. In that event the drain-source resistance goes large thus shutting off the current to the lithium ion cell.

Figure 13:
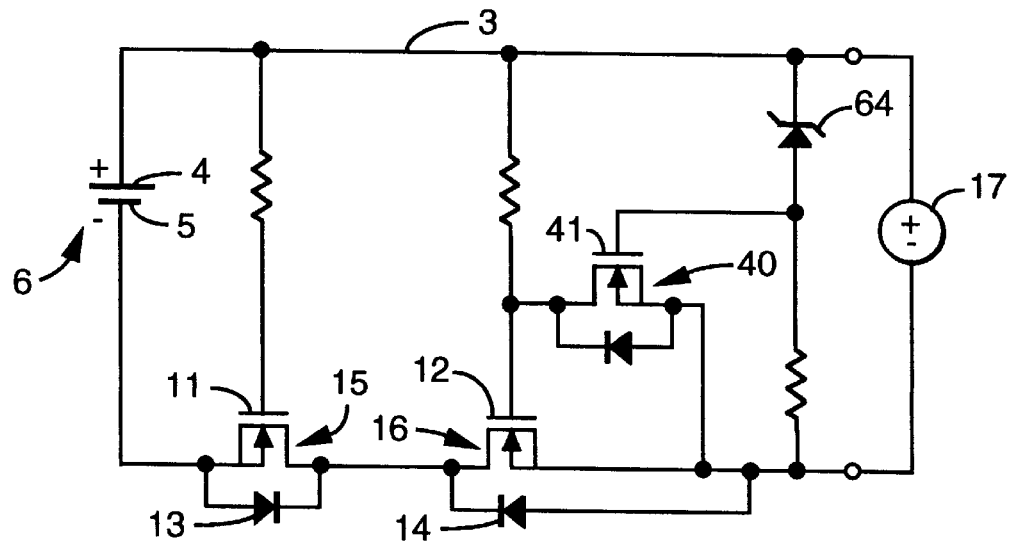
FIG. 13 is a conceptual diagram of a preferred safety switch of this invention utilizing a zener diode in the over-charge protection control circuit.

Another preferred embodiment of the safety switch of this invention is shown in FIG. 13. A zener diode 64 having a breakdown voltage equal to the over-charge voltage of the lithium ion cell 6 is reverse-bias connected between the gate 41 of a gate control device 40, normally non-conducting, and the positive terminal 4 of the lithium ion cell. When the over-charge voltage level (now equal to the breakdown voltage of the zener diode) is reached, the gate 41 threshold voltage is exceeded turning the insulated gate transistor on, thus clamping the gate voltage of the OCP MOSFET to the source voltage and rapidly shutting off the current through the OCP MOSFET 16.

What is claimed is:

1. A safety switch for a battery, comprising in operative combination:

a) at least one insulated gate transistor for switching electrical current off when a preselected threshold voltage limit is exceeded, said insulated gate transistor including a gate electrode in electrical communication with a terminal of the battery;

b) a control circuit disposed between said gate electrode and a terminal of the battery permitting electrical communication between said gate electrode and the terminal of the battery, said control circuit drawing no current from the battery during normal discharge of the battery, and during quiescent periods of non-use of the battery.

2. A safety switch as in claim 1 wherein said control circuit is selected from a direct connection to the battery terminal, a gate resistor, a zener diode, an insulated gate transistor, and combinations thereof.

3. A safety switch as in claim 1 wherein said insulated gate transistor is selected from at least one of an N-channel MOSFET, a trench FET, a VMOS FET, a DMOS FET, a PMOS FET and a CMOS FET.

4. A safety switch as in claim 3 wherein said insulated gate transistor is an N-channel MOSFET.

5. A safety switch as in claim 3 further comprising an over-charge circuit and an over-discharge circuit, said over-discharge circuit includes an N-channel MOSFET, and said over-charge circuit includes a PMOS FET.

6. A safety switch for a battery, comprising in operative combination:

a) a switching means responsive to the voltage of the battery for switching off electrical current to prevent exceeding at least one predetermined voltage limit in a circuit containing the battery, and b) a control circuit means for providing electrical communication between the battery and said switching means, said control circuit means drawing no current from the battery during normal discharge of the battery and during quiescent periods of non-use of the battery.

7. A safety switch for a battery as in claim 6 wherein said switching means includes at least one insulated gate transistor for switching electrical current off when at least one of said preselected threshold voltage limits is exceeded, said insulated gate transistor includes a gate electrode in electrical communication with a terminal of the battery.

8. A safety switch for a battery as in claim 6 wherein said control circuit means is selected from a direct connection to the battery terminal, a gate resistor, a zener diode, an insulated gate transistor, and combinations thereof.

9. A method for preventing exceeding predetermined voltage limits of a battery, comprising the steps of:

a) providing at least one insulated gate transistor switch in series with the battery, said insulated gate transistor having a predetermined threshold voltage to cause the resistance of the transistor to go large in the event the predetermined voltage limit is exceed;

b) providing a control circuit for each respective one of said insulated gate transistor switches to permit electrical communication of the gate of each respective one of said insulated gate transistors with a terminal on the battery, said control circuits drawing no current from the battery during normal discharge of the battery and during quiescent periods of non-use of the battery; and c) shutting off electrical current through said insulated gate transistor switch when a predetermined voltage limit of the battery is exceeded.

10. A battery arrangement comprising:

a battery;

a safety switch for controlling a flow of current through said battery, said safety switch comprising a pair of MOSFETs connected in series to a first terminal of said battery, said MOSFETs being oriented in opposite directions, a gate of a first MOSFET of said pair being connected through a first resistor to a second terminal of said battery, a gate of a second MOSFET of said pair being connected through a second resistor to said second terminal of said battery, a third MOSFET being connected between said gate and a source of said second MOSFET such that said gate and source of said second MOSFET are tied together when said third MOSFET is turned on.

11. A battery arrangement comprising:

a battery;

a safety switch for controlling a flow of current through said battery, said safety switch comprising a pair of MOSFETs connected in series to a first terminal of said battery, said MOSFETs being oriented in opposite directions, a gate of a first MOSFET of said pair being connected through a first resistor to a second terminal of said battery, a gate of a second MOSFET of said pair being connected through a second resistor to said second terminal of said battery, said first MOSFET being an enhancement mode MOSFET, said second MOSFET being a depletion mode MOSFET.

* * * * *